Nov. 25, 1947.  D. D. GRIEG  2,431,324

ELECTRICAL WAVE ANALYZING CIRCUIT

Filed Dec. 27, 1944

INVENTOR.
DONALD D. GRIEG

BY
*Lucy P. Lantry*
ATTORNEY

Patented Nov. 25, 1947

2,431,324

UNITED STATES PATENT OFFICE 2,431,324

ELECTRICAL WAVE ANALYZING CIRCUIT

Donald D. Grieg, Forest Hills, N. Y., assignor to Federal Telephone and Radio Corporation, New York, N. Y., a corporation of Delaware Application December 27, 1944, Serial No. 569,976

3 Claims. (Cl. 315—24)

This invention relates to electrical wave analyzing systems and more particularly to the calibration and measurement of the timing of electrical wave phenomena on the screen of the indicating oscillograph of the systems.

Many oscillographic applications require the measurement, particularly with respect to time of electrical wave phenomena. In order to be able to carry out such measurements by observing the screen of an oscillograph, a sweep is required which is preferably synchronized with the recurrent portions of the wave to be observed, as well as means for calibrating the screen of the oscillograph.

A saw-tooth type pulsation which is adjusted to cover the width of the oscilloscope is normally the means for sweeping the screen horizontally, the wave to be observed being applied to the vertical deflection plates. For calibrating the screen, equidistant pulses usually derived form a sinusoidal oscillatory wave and synchronously timed by the recurrent portion of the wave to be measured, are applied either simultaneously with the wave to be timed or in quick alternation therewith to the vertical plates of the oscilloscope.

It is an object of my invention to provide a method and means for supplying both a sweep as well as a calibration voltage for a conventional oscilloscope in response to a given electrical impulse.

In accordance with my invention, a given current pulsation is utilized to set up an oscillatory voltage in a tuned circuit and a saw-tooth type of voltage in a resistance-capacitance combination which have been provided in a common circuit serving to supply the vertical and the horizontal deflection plates of an oscilloscope respectively.

Figure 1:
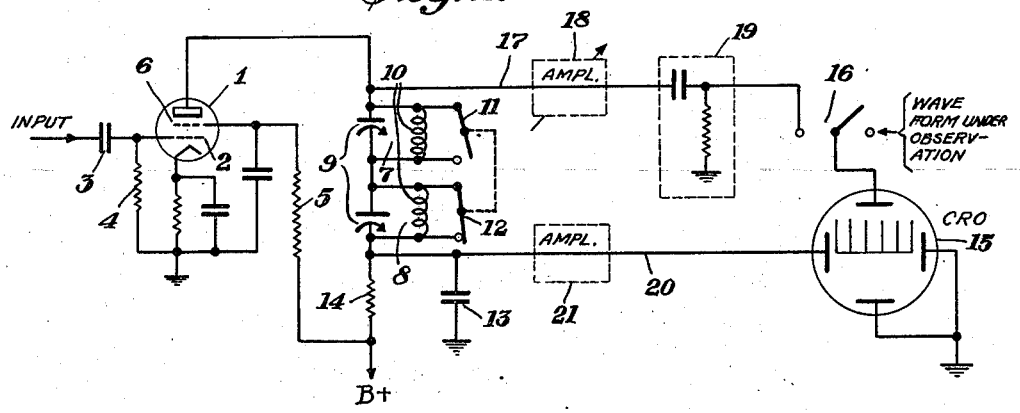
Figure 2:
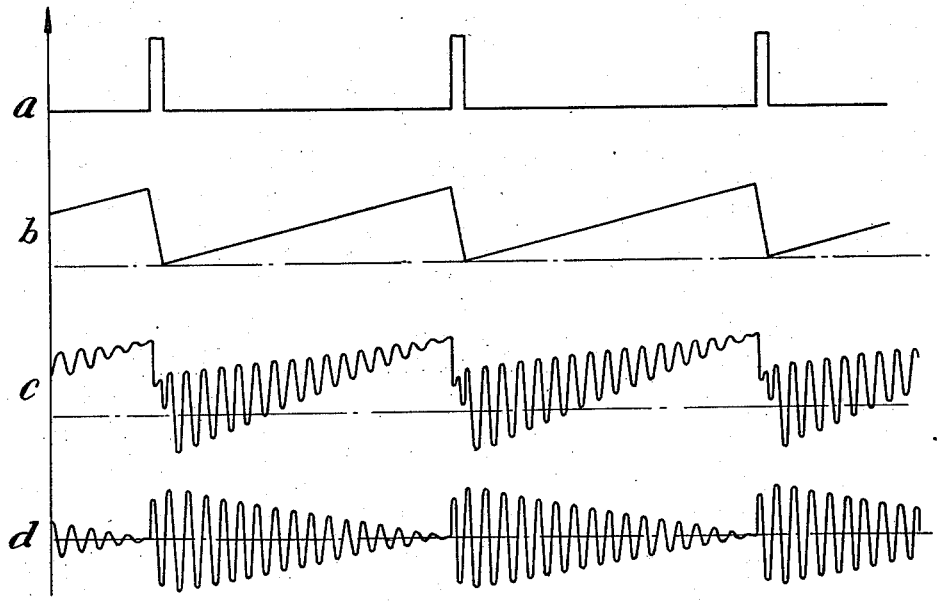

These and other features and objects of my invention will become more apparent as the description is read in connection with the accompanying drawings, wherein:

Fig. 1 is a schematic representation of a radio circuit in accordance with this invention; and Fig. 2 is a graphical illustration of the operation of the circuit of Fig. 1.

Referring to Fig. 1 of the drawings, a screen grid tube 1 is shown connected to receive a controlling input voltage on a grid 2 thereof over a coupling circuit comprised of a capacitance 3 and a resistor 4. A resistor 5 serves to determine the effective potential on a screen grid 6 of the tube. As is normal for a tetrode connected as shown, the plate voltage and plate circuit have no effect on the current flowing through the tube, the latter being in effect a constant current generator. The plate circuit of the tube includes one or more tuned circuits 7 and 8, each comprised of a variable capacitance 9 and inductance 10, respectively. The values of the capacitances 9 and inductances 10 are such as to furnish in combination oscillatory circuits for different ranges of calibration frequency, short circuiting switches 11 and 12 being provided to make possible the selective use of one or the other of the tuned circuits illustrated, in accordance with the desired frequency range. The switches 11 and 12 may be arranged mechanically in such a manner that one is opened when the other one is closed. Between the tuned circuits and ground there is connected a capacitance 13 which together with a resistor 14 forms a resistor capacitance combination of the type adapted to generate a saw-tooth type voltage by virtue of the condenser being charged from the plate potential supply B+ for the tube 1 through the resistor 14. The voltage from one of the two tuned circuits, together with that of the R.—C. combination may be applied to the vertical deflection plates of an oscilloscope 15 by way of a switch 16 and a connection 17. The switch 16 which may be mechanical or electronic is arranged so that the electric wave phenomena which are under observation and are to be analyzed may also be applied to the vertical plates. The connection 17 to the vertical plates may include an amplifier 18 and a low pass filter 19. These, however, may be omitted if not required, as will appear hereinbelow. The output of the saw-tooth generator circuit may be obtained over the connection 20 and applied thereby, to the horizontal deflection plates of the oscilloscope through an amplifier 21.

In Fig. 2, there is shown in graph $a$ the type of voltage pulsations which may be applied to the grid 2 of the tube 1, and which, since the tube acts as a constant current generator will act to inject corresponding current pulses through the respective series plate circuits thereof to set up the desired voltages therein. It is of course understood that the current pulses although shown as regularly recurring may in fact be spaced quite irregularly with subsequent variation in the periodicity of the phenomena directly dependent thereon. With each applied current pulse there will be set up in the tuned circuits 7 or 8, an oscillatory voltage of the type indicated in graph $d$, the wave being damped in the interval between the circuit energizing current pulsations as in graph $a$. The frequency of these oscillations is of course determined by the circuit parameters, that is, the respective values of condensers and inductances. The current pulse corresponding in wave shape to the pulsating voltage applied to the grid 2 upon becoming effective in the R.-C. combination will cause a discharge of the condenser 13 resulting in a saw-tooth wave form for the voltage of the R.-C. circuit the form of which is indicated in graph b. This saw-tooth voltage may be applied as a horizontal sweep voltage to the oscilloscope 15 in a conventional manner over the connection 20. The output of the oscillatory circuit obtainable over the connection 17 also contains the sweep voltage (graph b) so that the resulting voltage if the connection 17 is used alone will be a combination of the two as shown in graph c. If this is undesirable, a low pass filter 19 comprised of a condenser and resistor can be used to eliminate the low frequency sweep voltage components to result in an undistorted type of damped oscillatory wave in accordance with that shown in graph d.

The oscillatory voltage of graph d may then be directly applied to the vertical deflection plates, the amplifier 18 being adjusted to provide sufficient amplification so that only the substantially vertical and equidistant portions of the wave are observable on the screen providing a true means for calibrating the screen in terms of the time parameter as at 15 in Fig. 1.

The switch 16 can be mechanical or electronic whereby the wave to be analyzed and the calibrating pulses may be applied to the vertical plates in alternation at a suitable speed to provide either graphical or optical facilities, respectively, for timing the cyclic portions of the wave under observation.

The calibrating oscillatory wave may, as indicated above, be furnished directly to the oscilloscope or it may be used to produce a series of equidistant sharp single pulses, if such is desired, by means of so called shaping circuits including means for generating sharp pulses from sinusoidal type waves, an example of such circuits being disclosed in my co-pending application Serial No. 475,734, (Grieg 19), filed February 13, 1943, which however, I will not describe in any further detail beyond this reference as it does not form a part of this invention.

By thus incorporating both the calibrating as well as the sweep circuit into a single convenient circuit, a very simple means for supplying at the same time both a sweep and a calibrating wave voltage which is synchronized to the sweep has been provided.

While I have described above the principles of my invention in connection with specific apparatus it is to be clearly understood that this description is made only by way of example and not as a limitation on the scope of my invention as set forth in the objects of my invention and the accompanying claims.

I claim:

1. A system for calibrating wave phenomena comprising a cathode ray oscillograph, means for generating current impulses in response to voltage impulses, a tunable oscillatory circuit, a sawtooth generator in series with said circuit, said circuit and said generator forming the output circuit with respect to ground of said means for generating, separate voltage output means for said circuit and said generator for application to the vertical and the horizontal plates of said oscillograph respectively, and means for alternate application to the vertical oscillograph plates of said oscillatory circuit and the wave phenomena to be observed.

2. A system in accordance with claim 1, wherein said output means of the said oscillatory circuit includes a low pass filter.

3. A system in accordance with claim 1, wherein said means for generating comprises a screen grid vacuum tube.

DONALD D. GRIEG.

REFERENCES CITED

The following references are of record in the file of this patent:

UNITED STATES PATENTS

| Number | Name | Date |
|---|---|---|
| 2,215,776 | Barnard | Sept. 24, 1940 |

OTHER REFERENCES

Proc. of the I. R. E., vol. 28, No. 9, September 1940, "Generation of Synchronizing Pulses by Impulse Excitation," by Sherman.